United States Patent [19]

Morio et al.

[11] 3,840,771

[45] Oct. 8, 1974

[54] DYNAMIC CONVERGENCE CIRCUIT

[75] Inventors: Minoru Morio; Yutaka Nakagawa; Masao Suzuki, all of Tokyo, Japan

[73] Assignee: Sony Corporation, Tokyo, Japan

[22] Filed: Mar. 26, 1973

[21] Appl. No.: 344,959

[30] Foreign Application Priority Data

Mar. 31, 1972 Japan .............................. 47-37956

Mar. 31, 1972 Japan .............................. 47-37957

[52] U.S. Cl. .............................................. 315/13 C

[51] Int. Cl. .............................................. H01j 29/70

[58] Field of Search ........ 315/13 C, 13 R, 27 R, 26; 118/5.4 R, 5.4 M

[56] References Cited

UNITED STATES PATENTS

| | | | |
|---|---|---|---|
| 3,440,479 | 4/1969 | Brockmann | 315/13 C |
| 3,447,025 | 5/1969 | Kool | 315/13 C |
| 3,638,064 | 1/1972 | Hosoya et al. | 315/13 C |
| 3,763,391 | 10/1973 | Rollins | 315/13 C |

*Primary Examiner*—Maynard R. Wilbur

*Assistant Examiner*—J. M. Potenza

*Attorney, Agent, or Firm*—Lewis H. Eslinger, Esq.; Alvin Sinderbrand, Esq.

[57] ABSTRACT

A dynamic convergence circuit for color television receivers which has a dynamic convergence winding connected in series to an output coil provided for a horizontal deflection output device performing the switching operation and an impedance element connected in parallel to the dynamic convergence winding. A horizontal pulse voltage appears at the output coil and the output coil is operative to integrate the horizontal pulse voltage in cooperation with the impedance element to supply a current of generally parabolic waveform with a horizontal scanning period repetition to the dynamic convergence winding, to thereby maintain the proper beam convergence in response to beam scanning.

10 Claims, 7 Drawing Figures

DYNAMIC CONVERGENCE CIRCUIT

BACKGROUND OF THE INVENTION

1. Field of the Invention

This invention relates generally to dynamic convergence circuits for plural electron beam display apparatus such as a color television receiver, and is more particularly directed to an improved dynamic convergence circuit of reduced complexity provided together with a horizontal deflection circuit.

2. Description of the Prior Art

In most color cathode ray tubes employed in color television receivers for commercial use at present, plural electron beams, for example, three electron beams are utilized. In such a color cathode ray tube, respective electron beams emitted from its electron gun are deflected for beam scanning by a deflection yoke provided around the neck portion of the tube. An aperture mask is provided in the tube in front of the color phosphor screen for determining the impinging positions of the electron beams on the color phosphor screen. The respective electron beams impinge on the positions corresponding to red, green and blue color phosphors in response to their incident angles to the aperture of the mask. Thus, the electron beams scan the color phosphor screen under the control of the deflection yoke to form separate images of different primary colors and hence to display a full color image on the color phosphor screen. In order to form a correct full color image on the screen it is required that the plural primary color images should be formed on the screen with a superposition relation over all the points on the screen. To this end, arriving positions of the plural electron beams on the screen are required to be in superposition. This superposition is achieved by not only a static correction means but also by a dynamic correction means generally called a convergence means.

The static convergence means is provided for converging the plural electron beams at the center of the screen when the deflection yoke is inoperative. However, when the deflection yoke is operative the plural electron beams are subjected to different degrees of deflection by the deflection yoke because the electron beams pass through the deflection field established by the deflection yoke at different portions thereof. As a result, the electron beams may mis-converge as they move from the center of the screen to its periphery.

To correct or compensate for the misconvergence of the electron beams, an additional dynamic convergence coil is provided as a dynamic convergence means in addition to the deflection yoke for beam scanning. The additional dynamic convergence coil is supplied with a current in accordance with a beam position to correct or compensate for the beam deflection state. To this end, a waveform of a generally parabolic shape with horizontal and/or vertical scanning period repetition is used as the current supplied to the dynamic convergence coil. Thus, the plural electron beams are deflected by the beam deflection field of the dynamic convergence coil to be converged correctly at all of points on the screen.

In the prior art, it has been proposed that the current having a waveform of parabolic shape with a repetition which is the same as the horizontal scanning period and which is fed to the dynamic deflection coil be formed by a circuit in which a horizontal pulse appearing at an output transformer of the horizontal deflection circuit is integrated by a series connection of a coil and a capacitor. The voltage of sawtooth waveform obtained across the capacitor is then fed to the dynamic convergence coil so as to apply the current of parabolic shape waveform. Such a circuit, however, is required to provide means for deriving the horizontal pulse from the horizontal output transformer, means for integrating the thus obtained horizontal pulse, means for adjusting the integrated pulse in amplitude and so on, separately, so that the circuit becomes complicated in construction.

SUMMARY OF THE INVENTION

The above and other disadvantages are overcome by the present invention of a dynamic convergence circuit for a plural beam cathode ray tube comprising a horizontal deflection output device provided for supplying a horizontal beam deflection current of generally sawtoothed waveform to a deflection coil for the horizontal scanning of beams, inductance means connected to the output of the output device, with a horizontal pulse voltage being produced at the inductance means, convergence coil means connected in series with the inductance means, and impedance means connected to the inductance means and in parallel with the convergence coil device, the impedance means being operative to integrate the horizontal pulse voltage in cooperation with the inductance means to supply a sawtoothed waveform voltage across the convergence coil and, by means of the sawtoothed waveform voltage, to have a current of generally parabolic waveform flow through the convergence coil device, thereby to maintain the proper convergence of the plural beams in response to the beam scanning.

In one preferred embodiment the output device comprises a transistor performing the switching operation in response to a horizontal driving signal supplied thereto. The impedance means comprises a series connection of a capacitor and a resistor. Furthermore in some embodiments the resistor comprises a variable resistor for varying the tilt of the sawtoothed waveform voltage supplied to the convergence coil device.

Accordingly, it is an object of this invention to provide an improved dynamic convergence circuit of reduced complexity for a plural beam color cathode ray tube.

Another object of this invention is to provide an improved dynamic convergence circuit which is simplified by being designed together with a horizontal deflection circuit.

The foregoing and other objectives, features, and advantages of the invention will be more readily understood upon consideration of the following detailed description of certain preferred embodiments of the invention, taken in conjunction with the accompanying drawings.

DESCRIPTION OF CERTAIN PREFERRED EMBODIMENTS

Figure 1:
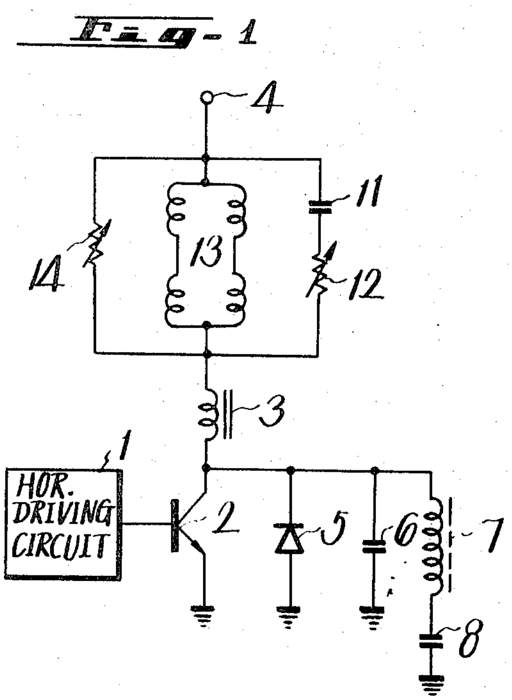
FIG. 1 is a schematic circuit diagram showing one embodiment of a dynamic convergence circuit according to the present invention.

FIG. 1 is a circuit diagram for illustrating an embodiment of this invention. In the figure reference numeral 1 designates a horizontal driving circuit whose output terminal is connected to the base electrode of an NPN-type transistor 2 which forms a horizontal output circuit. The emitter electrode of the transistor 2 is grounded while its collector electrode is connected through a horizontal output winding 3 and a dynamic convergence coil 13 to an electric power source terminal 4 which is supplied with a DC voltage from an external source (not shown). The collector electrode of the transistor 2 is grounded through a parallel circuit of a damper diode 5 and a capacitor 6 and also through a series circuit of a horizontal deflection coil 7 and a deflection current wave compensation capacitor 8.

The dynamic convergence coil 13 is connected in series between the power source terminal 4 and the end of the horizontal output winding 3 remote from the transistor 2. A series circuit of a capacitor 11 and a variable resistor 12 is connected in parallel with the dynamic convergence coil 13. A variable resistor 14 for correction of the amplitude of a parabolic waveform current is also connected in parallel with the dynamic convergence coil 13. In this case, the capacitance of the capacitor 11 may be selected, for example, as 0.022 micro-Farads ($\mu$F), the resistance value of the variable resistor 12 may be selected within a range of from 220 ohms ($\Omega$) to 500 ohms ($\Omega$) and the inductance value of the dynamic convergence coil 13 may be selected to be 14 milli-Henries (mH) to resonate with a signal with a frequency of 15.75 KHz.

With the circuit constructed as above, a horizontal pulse obtained at the horizontal output winding 3 is substantially integrated by the horizontal output winding 3 and the capacitor 11 and then a sawtooth waveform current flows from the power source terminal 4 to the circuit ground through the capacitor 11, the variable resistor 12 and the horizontal output winding 3 to impress a sawtooth waveform voltage across the dynamic convergence coil 13. This results in a parabolic shape waveform current $i_c$ with the horizontal scanning period repetition, which is shown in FIG. 2, flowing through dynamic convergence coil 13 to achieve the horizontal dynamic convergence compensation.

As mentioned above, with the circuit shown in FIG. 1 the parabolic shape waveform current flows through the dynamic convergence coil 13 without the provision of a separately provided coil for integration, so that the circuit construction is simplified.

Figure 2:
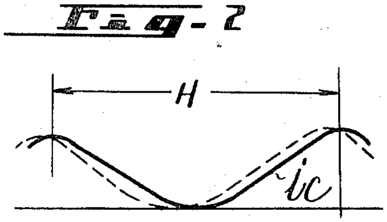
FIGS. 2 and 4 show waveforms used for explanation of the present invention.

Further, according to this invention if the resistance value of the variable resistor 12 is adjusted the phase or tilt of the parabolic shape waveform current $i_c$ can be controlled as shown in FIG. 2 by a dotted line. If the resistance value of the variable resistor 14 is adjusted the amplitude of the parabolic shape waveform current $i_c$ for the dynamic convergence compensation is controlled. In this case, it should be noted that, it is possible to adjust the amplitude and the tilt of the parabolic shape waveform current independently, which is an advantage of this invention.

Figure 3:
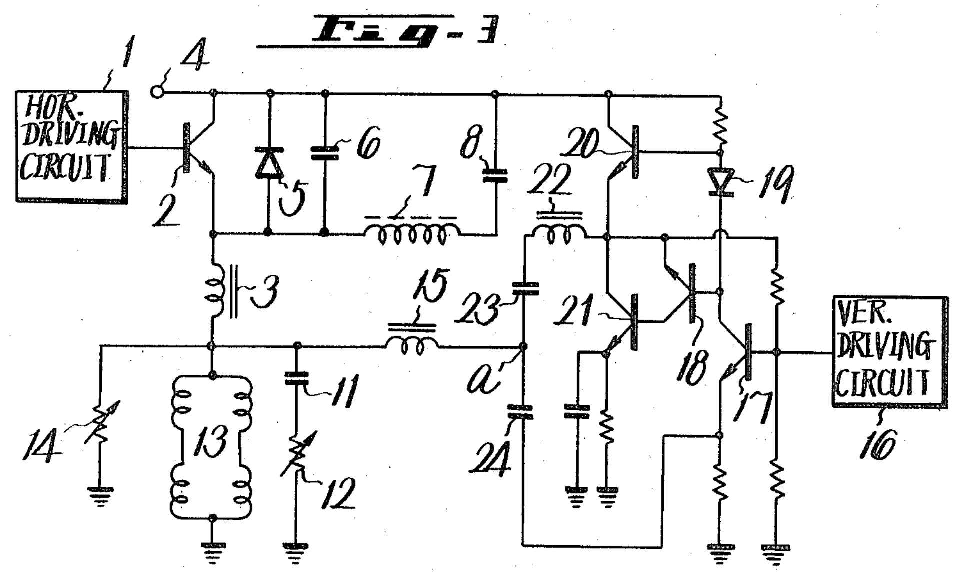
Figure 5:
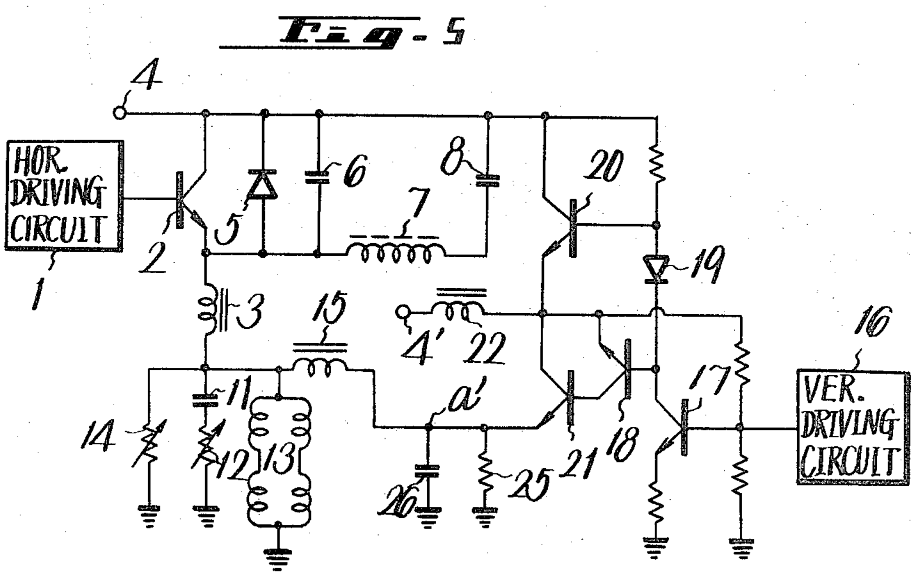

FIGS. 3 and 5, respectively show other embodiments of this invention in which horizontal and vertical convergence compensations are both performed. In these figures reference numerals similar to those of FIG. 1 designate similar elements so that their description is omitted for the sake of brevity.

In the embodiment of FIG. 3, the collector electrode of the transistor 2 for the horizontal output circuit is connected directly to the power source terminal 4 and the parallel circuit of the damper diode 5 and capacitor 6 is connected between the collector and emitter electrodes of the transistor 2. The series circuit of the horizontal deflection coil 7 and capacitor 8 for deflection current wave compensation is also connected between the emitter and collector electrodes of the transistor 2. The emitter electrode of the transistor 2 is grounded through the series circuit of the horizontal output winding 3 and dynamic convergence coil 13. The connection point between the winding 3 and the coil 13 is grounded through the series circuit of the capacitor 11 and variable resistor 12 and also through the variable resistor 14. Thus, a parabolic shape waveform current flows through the horizontal dynamic convergence coil 13 in the same manner as in FIG. 1. The connection point between the horizontal output winding 3 and the dynamic convergence coil 13 is further connected to a coil 15, which serves as a horizontal frequency stopper, such that a parabolic shape waveform current with horizontal scanning period repetition is obtained at the coil 15 and is blocked from being applied to a point *a*.

In FIG. 3 reference numeral 16 indicates a vertical driving circuit whose output terminal is connected to base electrode of an NPN-type transistor 17. The collector electrode of the transistor 17 is connected through the base-collector junction of a transistor 18 to the base electrode of a transistor 21, which forms a SEPP-type output stage together with a transistor 20. The collector electrode of transistor 17 is also connected to the cathode of a diode 19 whose anode is connected to the base electrode of the transistor 20. The connection point between the emitter electrode of the transistor 20 and the collector electrode of the transistor 21 is connected to the emitter electrode of transistor 18 and through a series circuit of a vertical deflection coil 22, capacitors 23 and 24 to the emitter electrode of the transistor 17. A sawtooth waveform current flows through the vertical deflection coil 22 so that a parabolic shape waveform current with a vertical scanning period repetition is delivered to the connection point *a* between the two capacitors 23 and 24.

Figure 4:
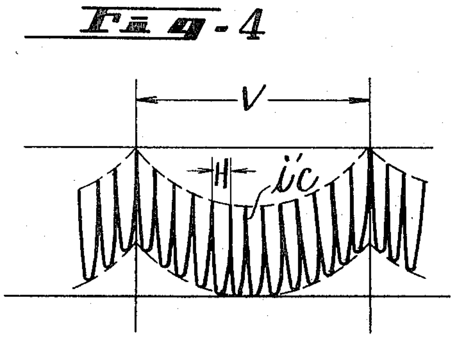

With the circuit shown in FIG. 3 a current $i'_c$, in which the parabolic shape waveform current with the vertical scanning period repetition for vertical dynamic convergence compensation is superimposed on the parabolic shape waveform current with the horizontal scanning period repetition for horizontal dynamic convergence compensation is obtained as shown in FIG. 4 to perform both vertical and horizontal dynamic convergence compensation.

In the embodiment of FIG. 5 a parabolic shape waveform current with the vertical scanning period repetition is obtained at the emitter electrode of the transistor 21 as described above in reference to the embodiment of FIG. 3. The connection point between the horizontal output winding 3 and the horizontal dynamic convergence coil 13 is connected through the coil 15, serving as a horizontal frequency stopper, to the common connection point *a'* of the emitter electrode of the transistor 21, a resistor 25 and a capacitor 26. The connection point between the emitter electrode of the transistor 20 and the collector electrode of the transistor 21 is connected through the vertical deflection coil 22 to another electric power source terminal 4' which is supplied with a DC voltage. The other circuit elements are connected in a manner similar to FIG. 3. The embodiment of FIG. 5 operates to attain the same effect as that of the embodiment of FIG. 3.

Figure 6:
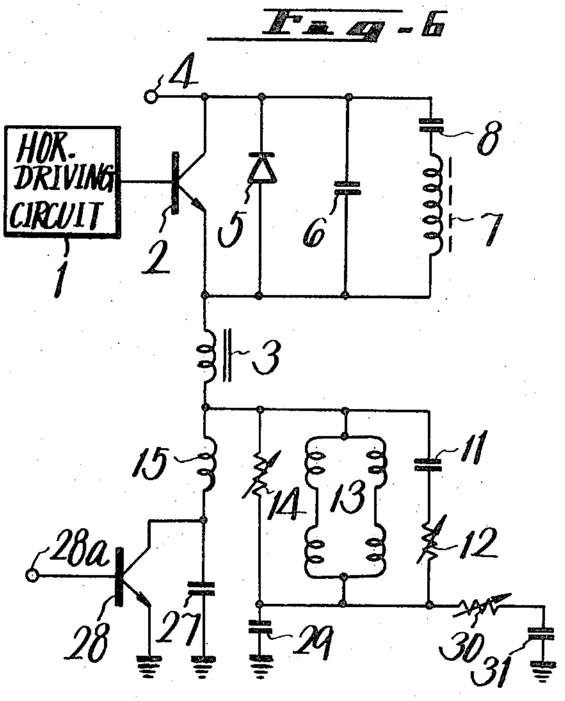
FIGS. 3, 5, 6 and 7 are schematic circuit diagrams respectively showing other embodiments of dynamic convergence circuits according to the present invention.
Figure 7:
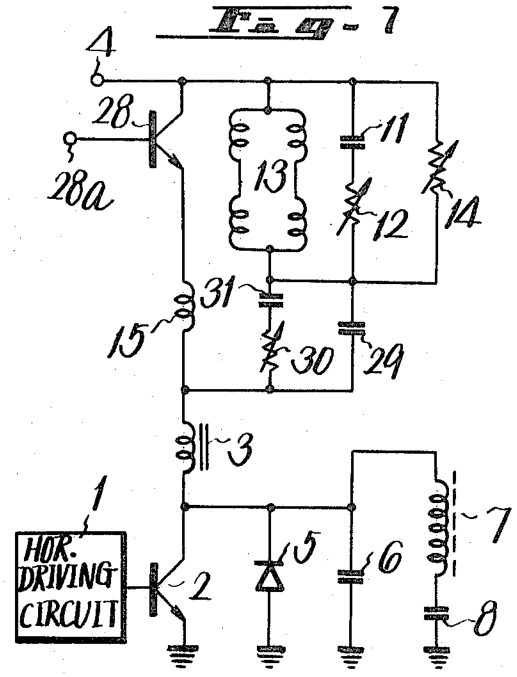

FIGS. 6 and 7, respectively show further embodiments of this invention in which reference numerals similar to those of the foregoing figures indicate similar elements. In these embodiments a pin-cushion compensation signal, which is applied to the horizontal deflection circuit for compensation of pin-cushion distortion of the raster, is used for vertical dynamic convergence.

In the embodiment of FIG. 6, the connection point between the horizontal output winding 3 and the dynamic convergence coil 13 is grounded through the series circuit of the coil 15 serving as a horizontal frequency stopper and a capacitor 27. The connection point between the coil 15 and the capacitor 27 is connected to the collector electrode of an NPN-type transistor 28 whose emitter electrode is grounded. An input terminal 28*a* for a pin-cushion compensation signal is connected to the base electrode of the transistor 28. The input terminal 28*a* may be supplied with a parabolic shape waveform current with a vertical scanning period repetition for pin-cushion compensation. The dynamic convergence coil 13 is grounded through a capacitor 29 and the connection point between them is grounded through a series circuit of a variable resistor 30 and a capacitor 31 for amplitude compensation of the parabolic shape waveform current with the vertical scanning period repetition.

In the embodiment constructed as above, the parabolic shape waveform current with the vertical scanning period repetition for pin-cushion compensation is applied to the base electrode of the transistor 28, which is connected in parallel to the dynamic convergence coil 13, through the input terminal 28*a*, so that a first parabolic shape waveform current with a vertical scanning period repetition such as, for example, shown in FIG. 4, flows through the dynamic convergence coil 13 where a second parabolic shape waveform current, with the horizontal scanning period, is superimposed on the first parabolic shape waveform current. Accordingly, it should be apparent that the vertical and horizontal convergence compensations are achieved by this embodiment as in the embodiments shown in FIGS. 3 and 5.

Since the parabolic shape waveform current with the vertical scanning period repetition for pin-cushion compensation is used in the embodiment of FIG. 6 as mentioned above, a separate circuit for producing the parabolic shape waveform current can be dispensed with.

The embodiment shown in FIG. 7 is similar to that shown in FIG. 6 except that the dynamic convergence circuit of FIG. 6 is connected to the power source side of the horizontal output transistor 2. It will be easily understood that this embodiment performs the same effect as that mentioned above.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

We claim as our invention

1. A dynamic convergence circuit for a plural beam cathode ray tube comprising:

a. a horizontal deflection output device including a deflection coil for the horizontal scanning of beams and means for supplying a horizontal beam deflection current of generally sawtoothed waveform to the deflection coil;

b. inductance means connected to the output of the horizontal deflection output device with a horizontal pulse voltage being produced at the inductance means;

c. a convergence coil device connected in series with the inductance means; and d. impedance means connected to the inductance means and in parallel with the convergence coil device, the impedance means being operative to integrate the horizontal pulse voltage in cooperation with the inductance means so as to supply a sawtoothed waveform voltage across the convergence coil and, by means of the sawtoothed waveform voltage, to cause a current of generally parabolic waveform to flow through the convergence coil device, whereby a proper convergence of the plural beams in response to the beam scanning is maintained.

2. A dynamic convergence circuit as recited in claim 1 including a power source for operating the horizontal deflection output device and wherein the series connection of the inductance means and the convergence coil device is connected between the output of the output device and one end of the power source.

3. A dynamic convergence circuit as recited in claim 2, wherein the output device comprises a transistor performing the switching operation in response to a horizontal driving signal supplied thereto from an external source.

4. A dynamic convergence circuit as recited in claim 1, wherein the impedance means comprises a series connection of a capacitor and a resistor.

5. A dynamic convergence circuit as recited in claim 4, wherein the resistor comprises a variable resistor for varying the tilt of the sawtoothed waveform voltage supplied to the convergence coil device.

6. A dynamic convergence circuit as recited in claim 5 further comprising an additional variable resistor connected in parallel with the convergence coil device for varying the amplitude of the parabolic waveform current flowing through the convergence coil device.

7. A dynamic convergence circuit for a plural beam cathode ray tube comprising:

a. a horizontal deflection output device including a deflection coil for the horizontal scanning of beams and means for supplying a horizontal beam deflection current of generally sawtoothed waveform to the deflection coil;

b. inductance means connected to the output of the horizontal deflection output device with a horizontal pulse voltage being produced at the inductance means;

c. a convergence coil device connected in series to the inductance means, d. impedance means connected to the inductance means and in parallel with the convergence coil device, the impedance means being operative to integrate the horizontal pulse voltage in cooperation with the inductance means so as to supply a sawtoothed waveform voltage across the convergence coil and, by means of the sawtooth waveform voltage, to supply a current of generally parabolic waveform with a horizontal scanning period repetition to the convergence coil device, and e. current supplying means connected to supply a current of generally parobolic waveform with vertical scanning period repetition to the convergence coil device, whereby the current of parabolic waveform with horizontal scanning period repetition is superimposed on the current of parabolic waveform with vertical scanning period repetition as it flows through the convergence coil device and maintains the proper convergence of the plural beams in response to the beam scanning.

8. A dynamic convergence circuit as recited in claim 7, wherein the current supplying means comprises a vertical deflection circuit and connecting means for connecting the vertical deflection circuit to the convergence coil device.

9. A dynamic convergence circuit as recited in claim 8, wherein the connecting means includes filter means for preventing the current of parabolic waveform with horizontal period repetition from being fed to the vertical deflection circuit.

10. A dynamic convergence circuit as recited in claim 7, wherein the current supplying means comprises a pin-cushion compensating circuit provided for modulating the horizontal beam deflection current with a signal of parabolic waveform with vertical scanning period repetition.

* * * * *